July 28, 1970
R. J. PIPER ET AL
3,522,336
METHOD AND APPARATUS FOR MOLDING A BLOCK
Filed June 8, 1967
3 Sheets-Sheet 1
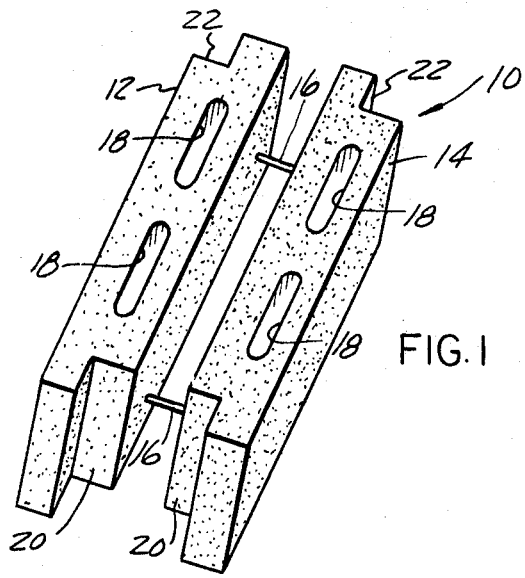
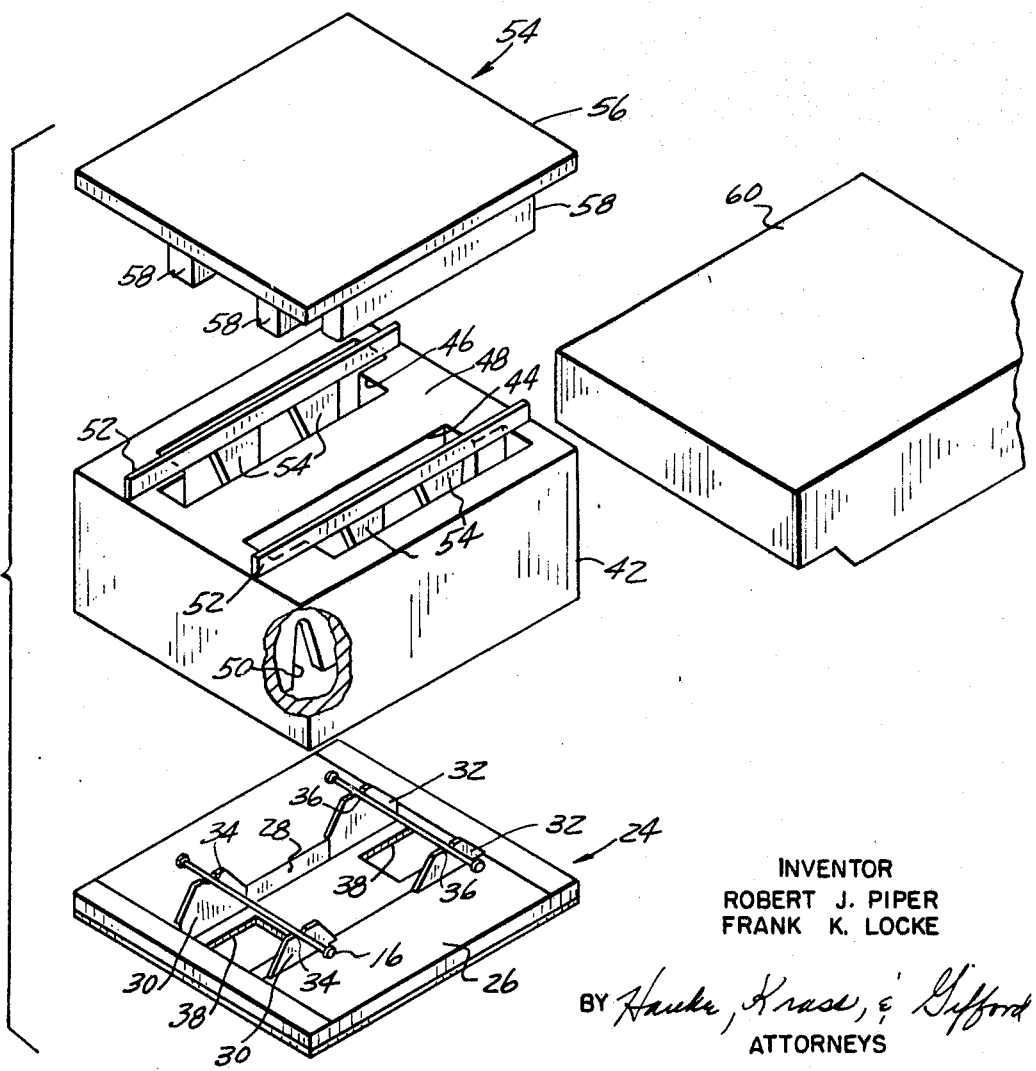
INVENTOR
ROBERT J. PIPER
FRANK K. LOCKE
BY Hauke, Krass, & Gifford
ATTORNEYS

INVENTORS
ROBERT J. PIPER
FRANK K. LOCKE

BY Hauke, Krass, & Gifford
ATTORNEYS

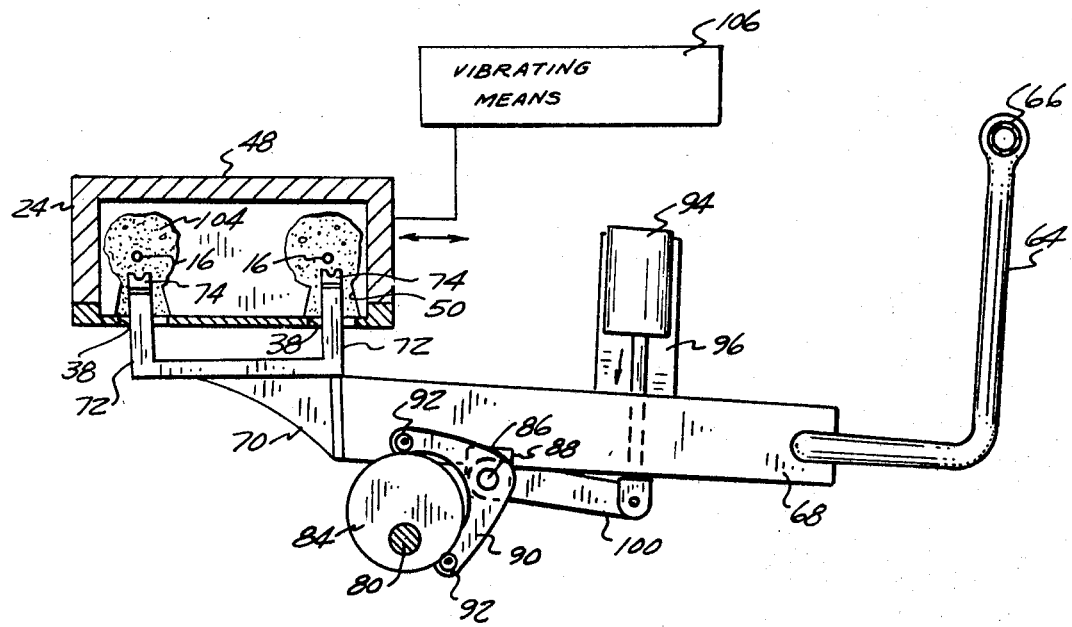
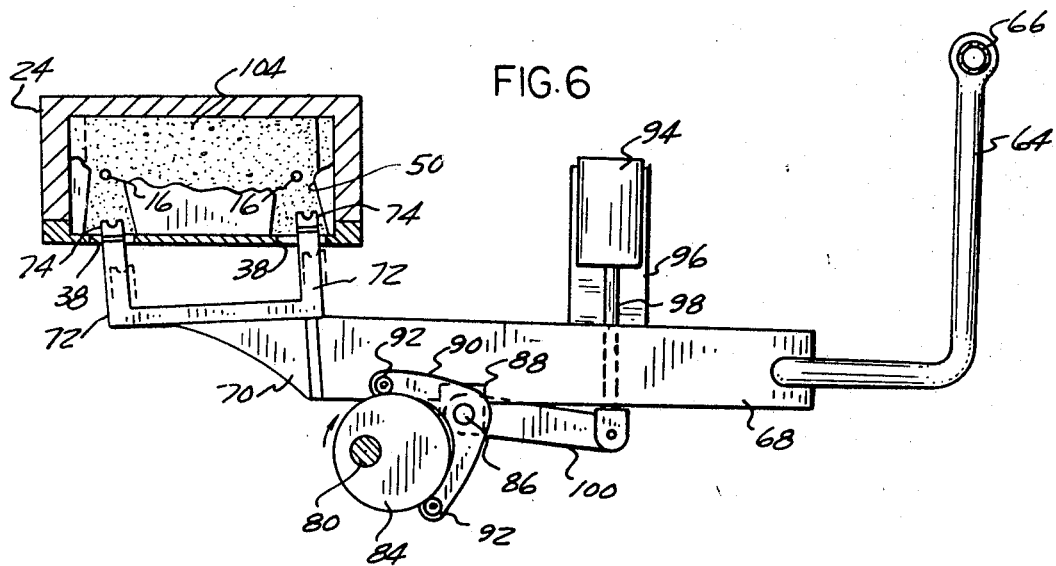

United States Patent Office

3,522,336
Patented July 28, 1970

3,522,336
METHOD AND APPARATUS FOR
MOLDING A BLOCK
Robert J. Piper, Detroit, and Frank K. Locke, Hudson,
Mich., assignors to Stearns Manufacturing Co., Flat
Rock, Mich., a corporation of Michigan
Filed June 8, 1967, Ser. No. 644,608
Int. Cl. B28b 1/08
U.S. Cl. 264—71         7 Claims

ABSTRACT OF THE DISCLOSURE

Method and apparatus for mounting a pair of metal pins within a mold for forming a block consisting of a pair of separated sections joined by the pins. The pins are supported on a pair of arms in a mold box which is then filled with a concrete mixture so that the ends of the pins are embedded in the concrete. The mold box is vibrated while the support arms are moved away from the pins. The compacting concrete, upon assuming a sufficient density to independently support the pins, separates the pins from the arms which are then removed from the molding box.

BACKGROUND OF THE INVENTION

Field of the invention

This invention relates to the manufacture of molded blocks having metal connecting and reinforcing rods joining spaced apart block sections, and in particular it relates to a novel method of embedding the pins in opposite block sections during the block molding step.

Description of the prior art

A variety of methods have been proposed to manufacture blocks of concrete formed of a pair of separated sections joined together by short rods or pins having their opposite ends embedded in opposite block sections. The present invention relates to a novel technique for the manufacture of blocks and to the apparatus useful in the practice of the technique. In my copending application Ser. No. 450,821, filed Apr. 26, 1965, for "Method of and Apparatus for Manufacture of Air Core Blocks" a novel method was disclosed for the manufacture of such blocks in a block making apparatus. In such a machine a pallet adapted to support a molded block is joined with a mold box having a configuration corresponding to a particular block. A feed drawer containing a measured amount of concrete is moved over the mold box and its contents poured through the open top of the mold box. The mold box and the feed drawer are then vibrated for a period of time to pack the concrete in the mold box. The feed drawer is then replaced by a packing head having a shape corresponding to the shape of the block to be formed. The packing head and the mold box are vibrated and then separated from the pallet. The pallet with a newly molded block is then transferred to the necessary drying or kiln operations.

The pallets disclosed in my aforementioned patent application comprise flat bases having uprights for supporting the metal tie pins which are mounted thereon prior to the movement of the pallet into the molding position. The uprights extend through the hollow section of the mold block which forms the air core of the completed block so that the two block sections are molded around them. The ends of the pins extend laterally from the uprights so that the concrete mixture embeds the ends when it is poured into the mold box. The uprights continue to support the tie pins in position until the sides of the block have hardened during the drying operation. After the blocks are completed the pallets are inverted so that the blocks fall off them. The pallets are then reinverted and new pins loaded on the uprights in preparation for a subsequent block forming cycle.

The broad purpose of the present invention is to provide a method and apparatus for supporting the tie pins within the mold box by a pair of uprights which are separated from the pins and withdrawn from the mold box prior to the drying or kiln operations, thereby providing a much faster and easier separation of the cured block.

SUMMARY

The preferred embodiment of the present invention, which will be subsequently described in greater detail, comprises a pallet having a flat base with a pair of short fixed pin supporting uprights. An arm-receiving aperture is defined in the pallet base intermediate each pair of fixed uprights. The preferred embodiment is described with reference to a pair of spaced block sections having a pair of tie pins connecting the block sections so that there are two spaced arm-receiving apertures. A tie pin is mounted on each pair of fixed uprights with the ends of the tie pins extending beyond the uprights and their mid-section disposed over the apertures.

An open topped mold box is then seated on the pallet. The mold box has a pair of cavity sections each associated with a block section and separated by a hollow mid-section which forms the air core of the completed block. The hollow section has suitable slots to accommodate the pins which extend into each of the cavity sections. A lever member having a pair of movable supporting arms is then raised so that the arms extend upwardly through the apertures and raise the pins off the fixed uprights. Magnets carried by the arms aid in retaining the tie pins in their raised position.

A feed drawer then pours a measured amount of concrete mix into each of the cavities so that the ends of the tie pins are embedded in the concrete mixture. The mold box and pallet are then vibrated to compact the concrete while the arms are slowly retracted downwardly with the pins. As the density of the mixture increases, the compacted material produces a force acting on the ends of the pins tending to resist their downward movement. This resisting force increases until the pins become separated from the arms and are supported solely by the molded block sections. The arms are then withdrawn through the apertures and separated from the pallet. The mold box is subsequently separated from the pallet which with the molded block sections and the pins are transferred to the drying kiln.

Thus it can be seen that the preferred practice of the present invention mounts the tie pins in the uncured concrete mixture by employing the increasing density of the concrete mixture during the compacting step to eliminate the necessity for retaining the pins in position during the curing operation by special arm means. Blocks manufactured in accordance with the preferred method and apparatus can be separated from their pallets after the curing process in a shorter period of time, without any special apparatus and without damage to the blocks.

It is therefore an object of the present invention to provide an improved method for forming a pair of spaced apart block sections joined together by tie pins having their opposite ends embedded in the block sections with the tie pins being supported by the uncured molded block sections independently of supporting arms prior to the curing step.

It is another object of the present invention to improve block forming apparatus for molding a block comprising separated block sections joined by tie pins and which includes a pair of movable tie pin supporting arms arranged to support the pins in position within a mold cavity until a concrete mixture poured in the cavity has been compacted to a sufficient density to support the ends of the tie pins independently of the support arms and including means for separating the support arms from the tie pins when they have been supported by the compacted mixture.

It is another object of the present invention to improve apparatus for molding blocks from a compactible cementitious material into a pair of separated block sections joined by elongated pins having their opposite ends embedded in opposite block sections by providing a form having a pair of spaced cavity sections for receiving an uncompacted charge of cementitious material, and means supporting an arm for movement between a first position wherein the arm is disposed within the form so that a pin supported by the arm has its ends extending into the cavity sections, and a second position wherein the arm is separated from the pin and the form.

It is still another object of the present invention to provide a pallet for molding blocks of a compactible material, the pallet having apertures for receiving arms which extend upwardly through the apertures to a position for supporting tie pins within a mold box and including means for withdrawing the arms from the pins when the material has been compacted to a density sufficient to support the ends of the pins independently of the support arms.

Still further objects will readily occur to one skilled in the art to which the present invention pertains upon reference to the following detailed description.

DESCRIPTION OF THE DRAWINGS

The description refers to the accompanying drawings in which like reference characters refer to like parts throughout the several views and in which:

FIG. 1 is a perspective view of a block built in accordance with the method and apparatus illustrating the preferred embodiment of the present invention;

FIG. 2 is a perspective view of a pallet formed in accordance with the present invention and supporting a pair of tie pins with a mold box, a packing head, and a feed box, all arranged in the operating relation assumed in the machine employed in connection with the present invention;

FIG. 5 is a view illustrating the support arms being separated from the tie pins during the compacting step; and FIG. 6 shows the movable arms being separated from the pallet with the tie pins being supported entirely by the compacted material.

DESCRIPTION OF THE PREFERRED EMBODIMENTS

Figure 3:
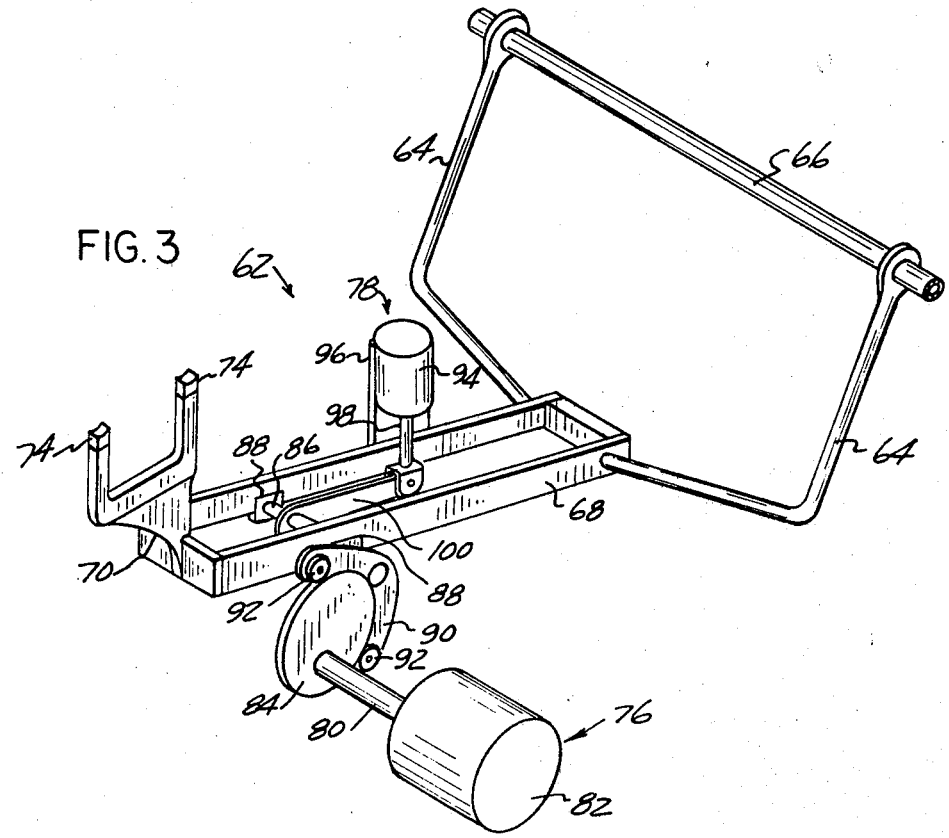
FIG. 3 is a diagrammatic view of the pin supporting arms and actuating mechanism employed with the pallet illustrated in FIG. 2.

Now referring to the drawings, a block formed in accordance with the practice and apparatus of the present invention is illustrated in FIG. 1, and generally indicated at 10. The block 10 consists of a pair of substantially identical but inverted sections 12 and 14 having generally planar sides arranged in spaced parallel relationship so that the block sections 12 and 14 are separated from one another and joined by a pair of metal tie pins 16. The pins 16 are elongated metal rods, each having one end embedded in the block section 12 and the other end embedded in the block section 14. Preferably the block sections 12 and 14 are separated from one another by the pins 16 a distance approximately equal to the thickness of the block sections. The block sections 12 and 14 each have a pair of air spaces 18 formed along their length and end sections 20 and 22 adapted to permit the block 10 to be joined with a similarly formed block in an assembly operation.

It is to be understood that the present invention is not limited to use with a block of this type but is useful with any block consisting of separated sections joined by an elongated pin.

Referring to FIG. 2, a pallet generally indicated at 24 which receives the block and supports it during both the molding and curing operations forms an essential part of this invention. The pallet has a flat base 26 with a rectangular recessed portion 28 associated with the air core of the formed block 10. A first pair of uprights 30 and a second pair of uprights 32 are fixed to the pallet 26 adjacent the long sides of the recess 28.

A pair of aligned transverse notches 34 formed along the extreme upper edge of the fixed uprights 30 and a second pair of aligned transverse notches 36 formed in the extreme upper edge of the uprights 32 are adapted to retain the pair of tie pins 16 which are to form a part of a molded block. The tie pins 16 are seated in the notches 34 and 36 with their ends extending beyond the recess 28 to points above base 26.

A generally rectangular aperture 38 is formed in the pallet 26 between each pair of the fixed uprights 30 and 32. As best seen in FIG. 2, the apertures 38 are arranged in the recessed portion 28 and below the mid-section of the pins 16.

A preferred mold box 42 used in connection with the preferred embodiment to form the block 10 is adapted to mate with the pallet 24 and is generally formed in accordance with the teachings of the prior art. The mold box 42 has a generally rectangular shape with a pair of cavity sections 44 and 46 extending vertically through the box. The cavity sections 44 and 46 constitute a mold section for the block sections 14 and 12 respectively.

A center section 48 separates the cavities 44 and 46. The center section 48 is open at its bottom and has a width less than the distance between the uprights 30 and 32. Each side of the center section 48 has a pair of contoured slots 50, so that the mold box 42 can be seated on the base 26 of the pallet and over the pins 16 with the ends of the pins 16 extending into the cavities 44 and 46.

A pair of elongated support bars 52 extending along the length of the top surface of the mold box 42 and spanning the cavities 44 and 46 have downwardly depending form members 54 which project through the center of the cavities 44 and 46 to form the air cores 18 of the block sections 12 and 14.

A packer head, generally indicated at 54, is also designed for the particular block 10 and accommodates the mold box 42 and the pallet 24. The packer head 54 consists of a generally flat plate 56 having four downwardly depending legs 58. The legs 58 are adapted to extend into the cavities 44 and 46 on opposite sides of the support bars 52 in order to fully tamp the concrete mixture which has been placed in the mold box 42 into the shape of the block 10.

A feed drawer 60 is adapted to dispense a measured quantity of concrete into the mold box 42 when the box is seated on the pallet 24. The feed drawer 60 is shown in schematic form to illustrate its relative position with respect to the pallet 24 when the mold box 42 and the packing head 54 are in a suitable block forming machine.

FIG. 3 illustrates a preferred retaining pin elevating assembly 62 employed in combination with the pallet 24 and the mold box 42 in forming the block 10. The pin elevating assembly 62 comprises a pair of spaced, bent arms 64 having their upper ends pivotably mounted to a pivot member 66 and their lower ends rigidly attached to a frame 68. A pin supporting section 70 fixed to the free end of the frame 68 has a pair of upwardly directed pin supporting arms 72 and 74. The pin supporting arms 72 and 74 are spaced a distance corresponding to the distance between the apertures 38 of the pallet 24 and have a rectangular cross-section and a gradual vertical taper. Each arm terminates with a pin supporting portion 74. The pin supporting portions 74 are notched as indicated and preferably formed of a permanent magnet which attracts the pins 16 and assist in retaining the pins 16 in position. Thus it is to be understood that the arms 64, the frame 68, the support section 70 and the arms 72 and 74 are pivotable between raised and lowered positions about the pivot 66.

The movement of the arms 72 and 74 is controlled by a first drive means 76 and a second drive means 78. The drive means 76 includes a continuously rotating shaft 80 driven by motor means 82.

The shaft 80 is preferably mounted for rotation about an axis parallel to the axis of the pivot member 66. A cam member 84 having a peripheral contour is mounted on the shaft 80.

A short shaft 86 mounted for pivotable movement by a pair of pillow blocks 88 to the lower part of the frame 68 carries a substantially U-shaped follower member 90. A pair of rollers 92 mounted on the ends of the U-shaped member 90 ride on the contoured surface of the cam member 84. The cam member 84 has a contour such that as it rotates, the follower 90 pivots about the shaft 86 which is raised and lowered. Thus the first drive means 76 provides means for raising and lowering the arms 72 between their extreme upper and lower positions.

The drive means 78 comprises a hydraulic cylinder 94 mounted on a bracket 96 which extends upwardly from the frame 68. A downwardly depending extensible rod 98 carried by the cylinder 94 is connected to a lever 100 which is keyed to the shaft 86. Thus as the rod 98 is moved between its extended and retracted positions, the lever 100 precisely controls the position in which the follower 90 rides on the cam 84 which in turn influences the up and down movement of the arms 72. Normally the rod 98 is fully retracted when the arms 72 are in their raised position and then it is extended as the arms are brought downwardly so that the arms 72 commence their downward movement in a precisely controlled manner.

Figure 4:
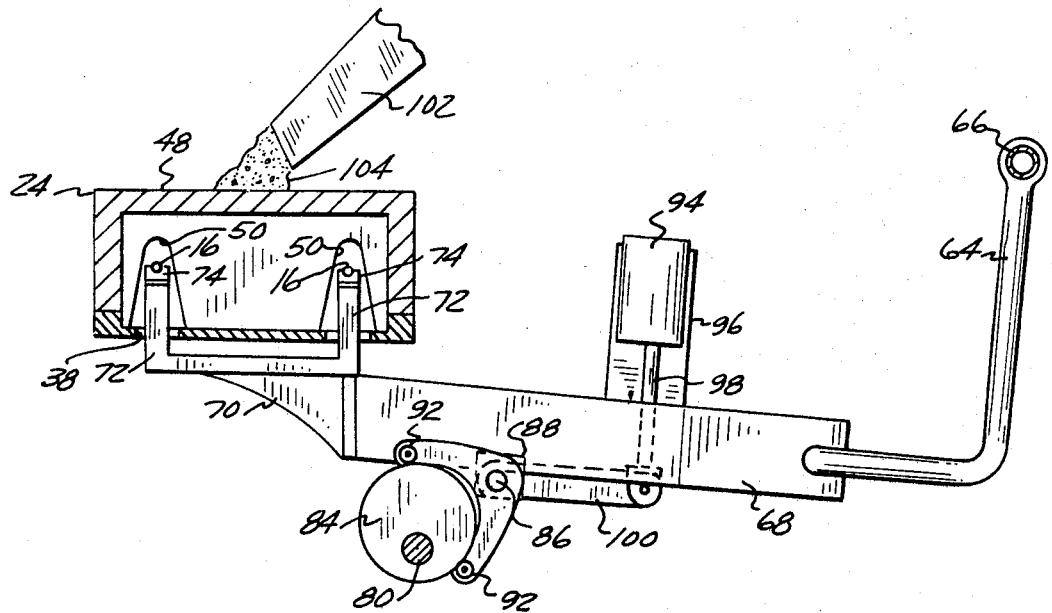
FIG. 4 is a diagrammatic view illustrating the step of filling the mold cavities with the uncompacted material while the tie pins are supported by the support arms.

Now referring to FIGS. 4, 5 and 6, for a description of the preferred method and assuming the pins 16 are disposed in the notches 34 and 36 of the fixed upright supports 30 and 32, the mold box is seated on the base 26 of the pallet 24 with the mid-section 48 of the mold box disposed in the recessed portion 28 of the pallet. The pin elevating assembly 94 is then raised from its lowered position so that the upper pin supporting portions 74 of the arms 72 are received through the apertures 38 of the pallet 24. This upward movement is continued until the portions 74 engage the mid-section of the pins 16 and lift them upwardly off the supports 30 and 32 to a raised position illustrated in FIG. 4 where the pins are spaced above the base 26 and with the free ends of the pins disposed within the cavities 44 and 46 of the mold box 42. Concrete pouring means 102 then pour a suitable mixture of concrete into each of the cavities 44 and 46 to a depth such that the free ends of the pins 16 are embedded in the concerte mixture 104.

Referring to FIG. 5, vibrating means 106 connected to the mold box 42 and pallet 44 commences to oscillate the form so that the concrete mixture 104 settles to assume a compacted state. As the concrete density increases, the hydraulic cylinder 94 is actuated by suitable control means (not shown) and commences to extend the rod 98 downwardly so that the arms 72 are withdrawn downwardly. As the density of the concrete mixture increases, it produces a force resisting the tendency of the pins 16 to settle downwardly under the influence of their weight and the bias of the magnetic pin receiving portions 74. This resisting force increases with the density until the pins 16 are separated from the arms 72 and are supported solely by the compacted mixture 104. The separation of the pins 16 from the pin receiving portions 74 approximately corresponds to the fully extended position of the rod 98 at which time the frame 68 commences to lower arms 72 under the influence of the drive means 76 at a more rapid rate.

Preferably, the cross-section of the arms 72 are such that there is little tendency for the concrete mixture to pour through the openings 38. Thus the arms 72 preferably have a width corresponding to the width of the openings 38 the length of the openings 38 accommodates the movement of the arms 72 as they are raised and lowered between their upper and lower positions.

When arms 72 have been fully retracted and with the pins supported solely by the compacted mixture 104, the feed drawer 54 is withdrawn to receive another charge and the packing head 60 moves downwardly so that the extending legs 58 pass through the tops of the cavities 44 and 46 to tamp the concrete within the mold box 42 and the pallet 24. The tamping head and the mold box are then lifted and separated from the pallet 24. The pallet with the molded block on the base 26 is then moved by suitable transfer means to a suitable kiln. The subsequent curing operation is well known to those skilled in the art and does not form a part of the present invention.

Thus it is to be understood that we have described an improved method for molding a pair of separated block sections formed of a compactible cementitious material and joined together by pins which are initially supported by a pair of arms movable with respect to the form and then supported solely by the compacted mixture.

It is to be understood that we have described the invention in its simplest terms and that various changes and modifications can be made therein without departing from the spirit of the invention as expressed in the scope of the appended claims.

Having thus described our invention, we claim.

1. In apparatus for molding a pair of spaced blocks connected together by a pin, the combination comprising:
 (a) a source of compactable block material;
 (b) a mold box having a hollow core disposed between a pair of mold cavities, a top for receiving block material into the mold cavities, and an opening for removal of blocks formed in the cavities;
 (c) an arm, and means for passing the arm into the hollow core to support the pin as block material is being received and molded in the cavities;
 (d) a pallet having an opening for receiving the arm, and structure for supporting a pin adjacent the opening, the pallet being movable from a position in the box in which a pain supported on said structure is disposed in the path of the arms motion into the box toward a position in which the pallet is removed from the box opening for the removal of molded blocks from the cavities; and
 (e) means for removing the arm from the hollow core prior to the pallet being removed from the box opening.

2. In a process for molding a pair of spaced blocks connected together by a pin, the steps of:
 (a) disposing a pin adjacent an opening in a wall of a mold cavity, the opening being formed for the removal of blocks molded in the cavity;
 (b) passing an arm through the opening to move the pin to a predetermined position in the cavity in which the pin is supported by the arm;
 (c) pouring a compactable block material into the cavity to embed each end of the pin in said material;
 (d) compacting the material to form a pair of blocks which support the pin independently of the arm;
 (e) removing the arm from the cavity; and
 (f) removing the blocks and the pin from the cavity.

3. The combination as defined in claim 2, in which the arm is removed from the cavity as the material is being compacted.

4. The process as defined in claim 2, in which the pin is of metal and the arm has a magnet for attracting the pin.

5. The combination as defined in claim 1, in which the cavity is formed of a mold box having a bottom opening;

and a pallet for closing the bottom opening as blocks are being molded in the box, and for supporting molded blocks being passed from the cavity through the bottom opening.

6. An apparatus for molding a pair of spaced blocks connected together by a pin, the combination comprising:
   (a) a source of block material;
   (b) a mold box for molding blocks of said material, said box having a top adapted for receiving unmolded block material from said source; and a bottom opening for removal of blocks molded of said material;
   (c) an arm for supporting the pin in a position in which it connects a pair of blocks being molded in the box;
   (d) a pallet for supporting blocks that are molded in the box, the pallet being movable from a first position in which is closes the bottom opening as blocks are being molded in the box toward a second position in which it is removed from the bottom opening to allow passage of a pair of blocks connected by the pin from the box through the bottom opening, the pallet having an opening disposed to receive the arm into the box when the pallet is in its first position;
   (e) a pin disposed in the box adjacent the pallet opening; and
   (f) drive means connected to the arm for passing it through the pallet opening into the box to raise the pin above the pallet and to support the pin as blocks are being molded and for removing the arm from the box to allow movement of the pallet from its first position toward its second position.

7. The combination as defined in claim 6, including a pair of uprights mounted on the pallet on opposite sides of the pallet opening, the uprights being adapted to support the pin adjacent the pallet opening.

References Cited

UNITED STATES PATENTS

| | | | |
|---|---|---|---|
| 2,469,599 | 5/1949 | Hawes | 25—121 |
| 2,987,795 | 6/1961 | Adams | 25—121 |
| 2,916,793 | 12/1959 | Ellis. | |

ROBERT F. WHITE, Primary Examiner

R. H. SHEAR, Assistant Examiner

U.S. Cl. X.R.

25—41

UNITED STATES PATENT OFFICE
CERTIFICATE OF CORRECTION

Patent No. 3,522,336   Dated July 28, 1970

Inventor(s)   R. J. Piper et al

It is certified that error appears in the above-identified patent and that said Letters Patent are hereby corrected as shown below:

Column 5, line 41, after "box" insert -- 42--;

Column 6, line 45, delete "pain" and insert --pin--

SIGNED AND SEALED
OCT 20 1970

(SEAL)
Attest:

Edward M. Fletcher, Jr.
Attesting Officer

WILLIAM E. SCHUYLER, JR.
Commissioner of Patents